ELECTRONIC FUNCTION GENERATOR

Filed July 12, 1963 2 Sheets-Sheet 1

INVENTOR.
ROBERT W. COPE.
BY
Killman, Smith & Lamb
ATTORNEYS

July 16, 1968 R. W. COPE 3,393,308
ELECTRONIC FUNCTION GENERATOR
Filed July 12, 1963 2 Sheets-Sheet 2
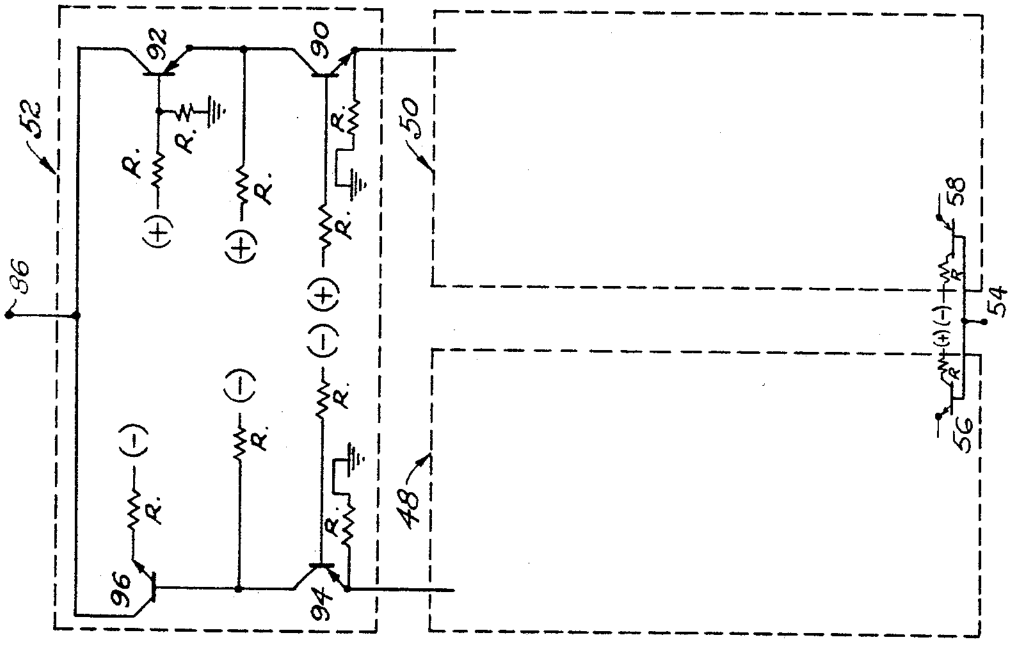
FIG. 4 SQUARING CIRCUIT 44 (WITH NEGATIVE OUTPUT)
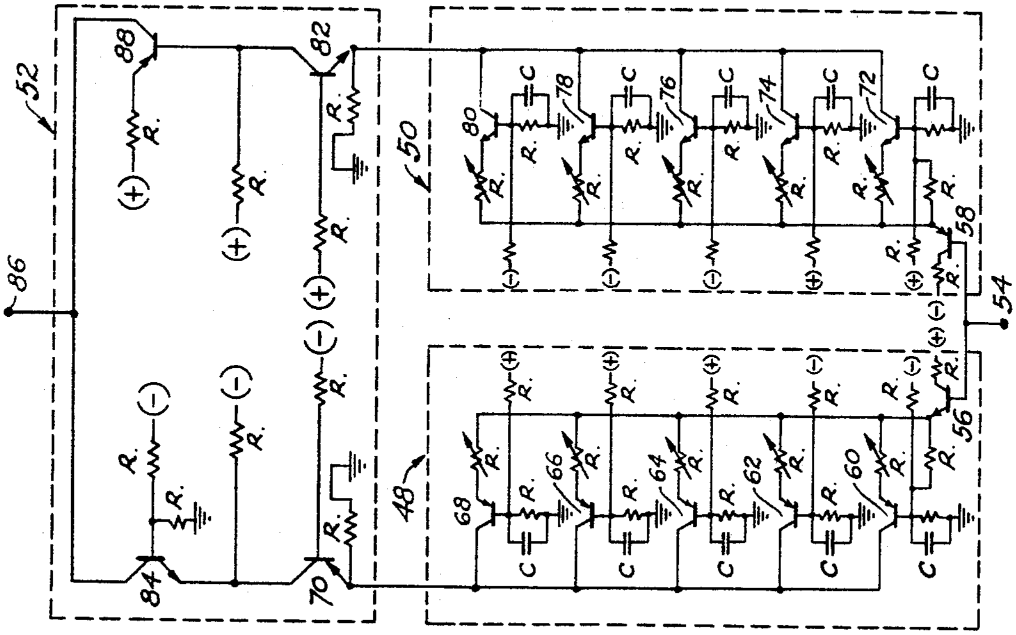
FIG. 3 SQUARING CIRCUIT 42 (WITH POSITIVE OUTPUT)
INVENTOR
ROBERT W. COPE
BY
Killman, Smith & Lamb
ATTORNEYS.

United States Patent Office 3,393,308
Patented July 16, 1968

3,393,308

ELECTRONIC FUNCTION GENERATOR

Robert W. Cope, Sparks, Md., assignor to The Bendix Corporation, Towson, Md., a corporation of Delaware Filed July 12, 1963, Ser. No. 294,670
3 Claims. (Cl. 235—197)

The present invention relates to an electronic multiplier and more specifically to an electronic squaring circuit for use in an analog multiplier.

In many special computer applications the need exists for four quadrature multiplication of continuous variables by electronic means at extremely high speeds. It is of course, highly desirable to have wide band characteristics and drift stability.

It is therefore an object of the present invention to provide an improved, accurate, and reliable means for multiplying two variables electronically.

Another object is to provide a novel multiplying circuit for squaring the sum and difference of two voltages to be multiplied and finding the difference between the squares.

A further object is to provide an electronic multiplier which is responsive to a frequency band pass of a width far exceeding that obtainable in existing multipliers.

A still further object is to provide an electronic multiplier which eliminates the use of feedback amplifiers and their inherent disadvantages.

Yet another object is to provide a novel squaring circuit responsive to both positive and negative inputs varying rapidly in amplitude and frequency.

Still another object is to provide a squaring circuit in which bias drift is reduced to a negligible factor.

These and other objects and many of the attendant advantages may best be understood by reference to the accompanying drawings wherein:

FIG. 3 is a schematic diagram of one embodiment of the squaring circuit shown in FIGURES 1 and 2 which provides a positive output.

FIG. 4 is a schematic diagram of another embodiment of the squaring circuit shown in FIGURES 1 and 2 which provides a negative output.

The principle of electronic multiplication of two variables by the quarter square principle is well known. The implementation of this principle requires that one-fourth of the difference between the square of the sum of two independent variables appearing at the input terminals and the square of the difference of the same two variables appear at the output terminals.

Figure 1:
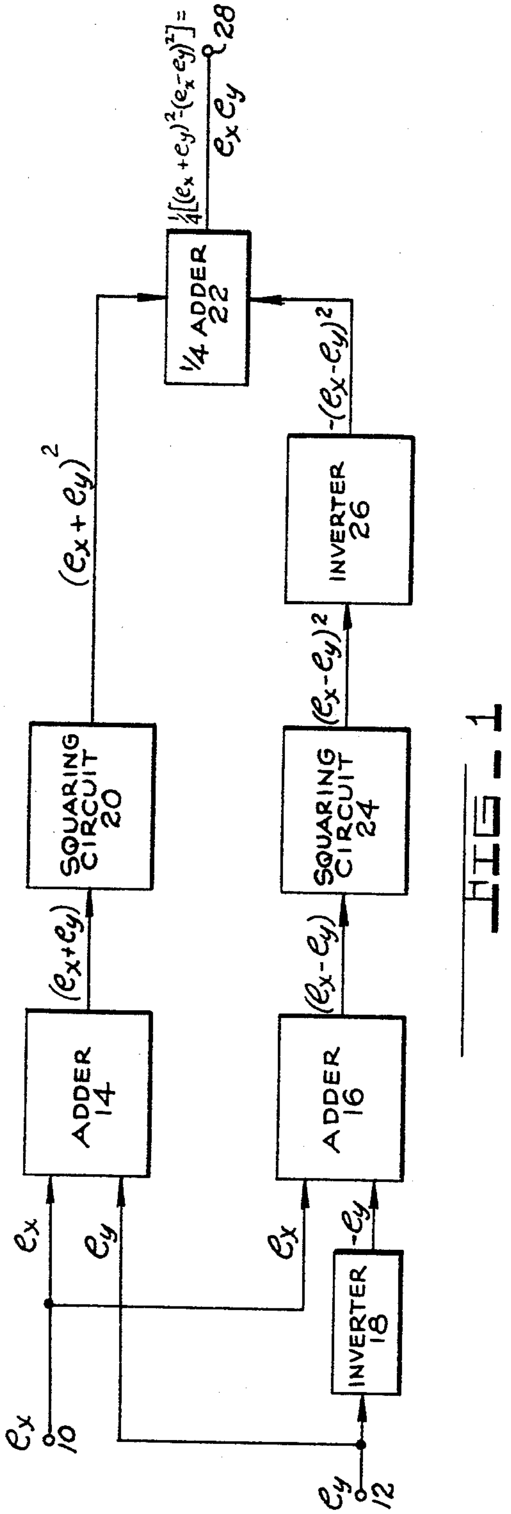
FIG. 1 is a functional block diagram of an electronic multiplier utilizing the method of electronic multiplication of two variables by the quarter square principle.

This principle as applied to electronic multiplication is shown generally in the functional block diagram of FIG. 1 wherein an input signal $e_x$ representative in polarity and magnitude of an independent variable X is applied through terminal 10 to the inputs of two adders 14 and 16. The second independent variable Y represented in polarity and magnitude by a signal $e_y$ is applied through terminal 12 to adder 14 and through inverter 18 to adder 16. The output of adder 14 is squared in squaring circuit 20 and applied to adder 22. The output of adder 16 is squared in squaring circuit 24 and inverted in inverter 26 before being applied to adder 22. One-fourth of the sum of the inputs to adder 22 is then applied to the output terminal 28.

Figure 2:
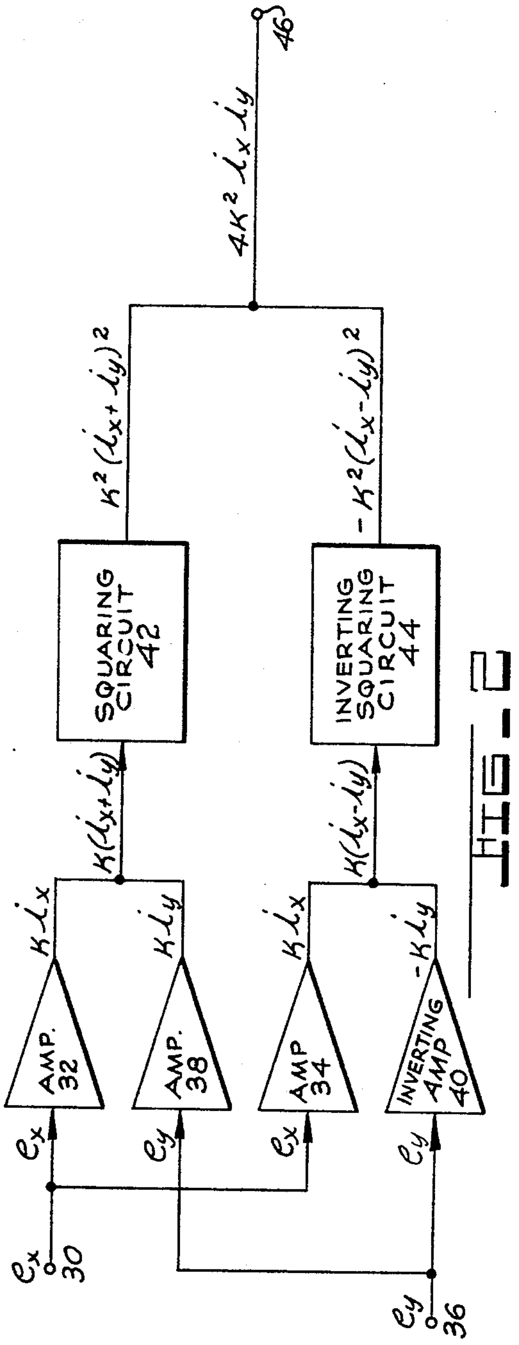
FIG. 2 is a circuit block diagram of an electronic multiplier incorporating my invention.

Referring now to the circuit block diagram in FIG. 2, the variable representative signal $e_x$ is applied through terminal 30 to amplifiers 32 and 34 while the second variable representative signal $e_y$ is applied through terminal 36 to amplifier 38 and inverting amplifier 40. These amplifiers may be any voltage fed, direct coupled, balanced amplifiers whose output current is a linear function of the input voltage and whose gain is represented by K in the referenced diagram. The output of amplifiers 32 and 38 are then combined in the input of squaring circuit 42, the novel circuitry of which is hereinafter explained. The output of amplifier 34 and inverting amplifier 40 are combined in a similar squaring circuit 44 whose output is inverted and combined with the output of squaring circuit 42. This sum is applied to the output terminal 28 and, when reduced by a factor equal to four times the square of the amplifier gain K, is representative of the product of the input variable representative signals $i_x$ and $i_y$.

Squaring circuit 42 as shown in detail in FIG. 3 in this particular embodiment, employs the approximation of five straight line segments to adequately represent square law characteristics. It is to be understood, however, that any degree of accuracy desired can be obtained by increasing the number of active elements and hence the number of straight line segments representing the desired curve.

Squaring circuit 42 is comprised of a positive signal receptive network 48, a negative signal receptive network 50, and unipolarizer network 52.

A signal applied to input terminal 54 is applied to the base of complementary transistors 56 and 58. Assuming for the moment that the input signal is positive in polarity, transistor 56 which is of the NPN type will conduct thereby accepting the signal for network 48. A bank of PNP transistors 60, 62, 64, 66 and 68 are biased to conduct at different voltage levels and as the emitter voltage of transistor 56 rises, transistor 60 conducts first, then transistor 62, then transistor 64 and so forth until transistor 68 conducts. As each of these PNP transistors conducts it delivers current to the emitter of PNP transistor 70 in unipolarizer circuit 52. Appropriate bias is obtained through resistors and capacitors of different values indicated generally by R and C and a source of direct current potential not shown. The gain of each transistor stage within the bank is adjusted so that their combined currents produce a square law output with a linear input.

If the signal applied to input terminal 54 is negative in polarity, transistor 58 conducts accepting the signal for network 50. Transistors 72, 74, 76, 78 and 80 are of the NPN type and are biased similarly to the PNP bank in network 48 to conduct at different voltage levels. As the emitter of transistor 58 becomes more negative transistor 72 conducts first, then transistor 74 and so forth until transistor 80 is conducting. As each of these NPN transistors conducts it delivers current to the emitter of transistor 82 in the unipolarizer circuit 52. The gain of each of the transistor stages within the bank is likewise adjusted so that their combined currents produce the desired square law output with a linear input.

The outputs of both the positive and negative signal receptive networks are proportional to the square of the inputs in magnitude and are of the same polarity as the inputs. As is well understood, the square of both positive and negative quantities is positive. It is therefore necessary to reverse the polarity of the output of the negative signal receptive network in squaring circuit 42 to yield a positive output at terminal 86.

In the unipolarizer network 52 of squaring circuit 42, this is accomplished by applying the output of the positive signal receptive network 48 to the emitter of PNP transistor 70 whose collector is connected to the emitter of NPN transistor 84. The collector of transistor 84 is in turn connected to the output terminal 86. The output of negative signal receptive circuit 50 is connected to the emitter of NPN transistor 82 whose collector is connected to the base of PNP transistor 88. The collector of transistor 88 is in turn connected to output terminal 86. By applying the negative signal of transistor 82 to the base of PNP transistor 88, the output of network 50 is reversed in polarity. All transistors are appropriately biased by resistors denoted generally by R and a source of direct current power not shown.

Squaring circuit 44 as shown in FIG. 4 is identical to squaring circuit 42 in positive signal receptive network 48 and negative signal network 50. However, the polarity of the positive signal receptive network 48 is reversed in unipolarizer network 52. This arrangement is equivalent to reversing the polarity of the negative signal receptive network 50 to yield the required positive output for both positive and negative inputs and then reversing the output of squaring circuit 44 for summing as the difference of the squares as is required by the quarter square method of multiplication.

The output of negative signal receptive network 50 is connected to the emitter of NPN transistor 90 whose collector is connected to the emitter of PNP transistor 92. The collector of transistor 92 is connected to the output terminal 86 of the squaring circuit. Reversal of the polarity of the output of the positive signal receptive network 48 is accomplished by connecting the output to the emitter of PNP transistor 94 whose collector is connected to the base of NPN transistor 96. The collector of transistor 96 is connected to the output terminal 86 of the squaring circuit. All transistors are appropriately biased by resistors denoted generally by R and a source of direct current potential (not shown).

While the present invention has been described in some detail with reference to a particular embodiment thereof, it will be obvious to those skilled in the art that many changes, combinations, and modifications can be effected without departing from the spirit or scope of the present invention as set forth with particularly in the appended claims.

I claim:

1. A squaring circuit having input and output terminals comprising:

a positive signal receptive direct coupled biased transistor network, the output of which is proportional to the square of the input;

a negative signal receptive direct coupled biased transistor network, the output of which is proportional to the square of the input;

a unipolarizer transistor network for converting the output of said positive and of said negative signal receptive networks to a single polarity;

means for connecting the input terminals of said squaring circuit to the input of said positive and negative signal receptive networks;

means for connecting the output of said unipolarizer transistor network to the output terminals of said squaring circuit;

a source of direct current power;

and means connected to said source biasing said transistor networks.

2. A squaring circuit as set forth in claim 1 where the positive signal receptive network is comprised of:

a first NPN transistor having collector, emitter, and base electrodes;

input terminals for applying said signal to said base electrode of said first NPN transistor;

a plurality of PNP transistors having collector, emitter and base electrodes;

means connecting said collector electrodes of said plurality of PNP transistors to the output terminal of said positive signal receptive network;

means for connecting the emitter electrode of said first NPN transistor to the emitter electrodes of said plurality of PNP transistors;

a source of direct current power;

and means connected to said source for biasing the base and emitter electrodes of said plurality of PNP transistors and the emitter and collector electrode of said NPN transistor such that the potential at said output terminal is a positive signal proportional to the square of the positive signal applied to said input terminals of said network;

and the negative signal receptive network is comprised of:

a first PNP transistor having collector, emitter, and base electrodes;

input terminals for applying said negative signal to the base electrode of said first PNP transistor;

a plurality of NPN transistors having collector, emitter and base electrodes;

means connecting said collector electrodes of said plurality of NPN transistors to the output terminal of said negative signal receptive network;

means for connecting the emitter electrode of said first PNP transistor to the emitter electrodes of said plurality of NPN transistors;

a source of said direct current power; and means connected to said source for biasing the base and emitter electrodes of said plurality of NPN transistors and the emitter and collector electrode of said first PNP transistor such that the potential at said output terminal is a negative signal proportional to the square of the negative signal applied to said input terminal of said network;

and the unipolarizer network is comprised of means for reversing the polarity of the output of the negative signal receptive network to obtain a positive output of the squaring circuit.

3. A squaring circuit as set forth in claim 2 where the unipolarizer network is comprised of means for reversing the polarity of the positive signal receptive network to obtain a negative output of the squaring circuit.

References Cited

UNITED STATES PATENTS

| | | | |
|---|---|---|---|
| 2,855,468 | 10/1958 | Lohman | 330—15 X |
| 2,900,137 | 8/1959 | Giser | 235—194 |
| 2,906,459 | 9/1959 | Lovell | 235—194 |
| 3,088,671 | 5/1963 | Chase | 235—197 X |
| 3,177,350 | 4/1965 | Abbott et al. | 235—194 X |

MALCOLM A. MORRISON, *Primary Examiner*.

K. W. DOBYNS, F. D. GRUBER, *Assistant Examiners*.